June 16, 1931.  E. GOVETT  1,810,104
PREPARATION OF COLLOIDAL HALOGENS
Filed March 20, 1928
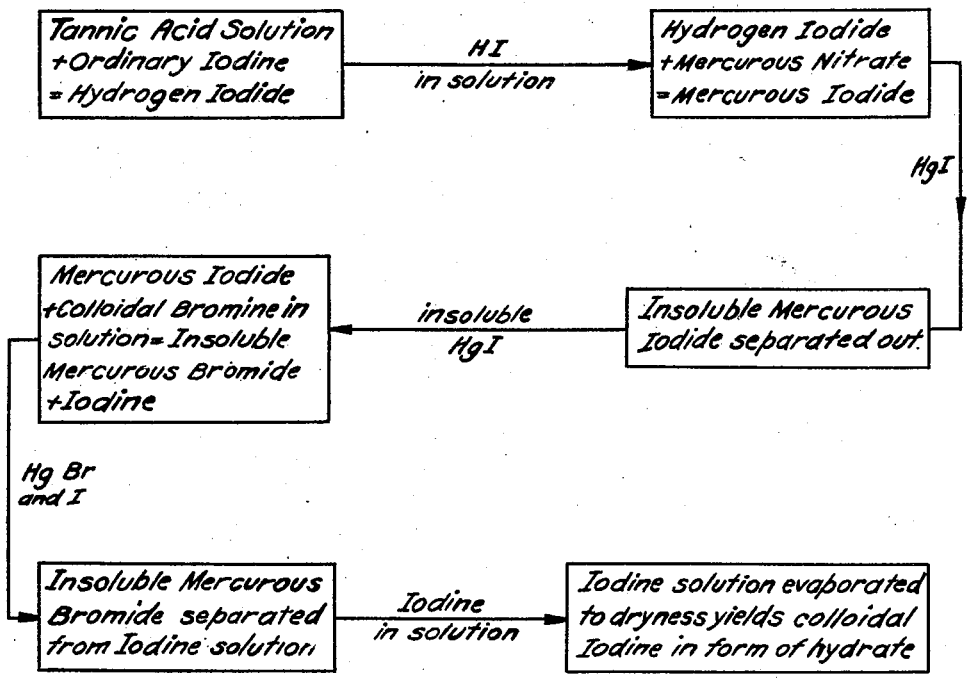
Inventor
ERNEST GOVETT
By his Attorneys
Cooper, Kerr & Dunham Patented June 16, 1931

1,810,104

UNITED STATES PATENT OFFICE

ERNEST GOVETT, OF NEW YORK, N. Y., ASSIGNOR TO GOVETT, LTD., OF NEW YORK, N. Y., A CORPORATION OF NEW YORK

PREPARATION OF COLLOIDAL HALOGENS

Application filed March 20, 1928. Serial No. 263,211.

This invention relates to halogens, especially iodine, and its chief object is to provide a colloidal form of iodine, capable of making a homogeneous solution in water. This form of iodine, which for convenience I term "iodine alpha", is non-toxic and may be used freely for medicinal purposes without harmful effects. I obtain it in solid form in what is apparently a hydrate. Another object is to provide a simple and reliable process of producing the alpha form of iodine mentioned. A further object is to provide a process by which bromine may be changed to a colloidal non-toxic form. I believe that in the above mentioned products the iodine and bromine are present as allotropic forms of the elements. Other objects will appear from the following detailed description of the preferred way of carrying out the invention.

In the preferred practice of my colloidal iodine or "iodine alpha" process I first form colloidal hydrogen iodide (hydriodic acid, HI) by reaction of iodine, which may be the ordinary commercial form of the element, with an organic acid in aqueous solution. The acids which may be used for the purpose are such as have, or will behave as if they had, an "odd" or "loose" atom of hydrogen, as for example tannic and gallic acids. By a mathematical reaction I then form with the hydrogen iodide an insoluble iodine compound, for instance an iodide of lead, silver, copper, bismuth, thallium, or, preferably, mercury, as by adding to the hydrogen iodide solution a suitable nitrate or acetate. I then remove the insoluble iodine compound and decompose it by means of a reagent which will produce an insoluble compound devoid of iodine and at the same time liberate iodine in solution, either free or combined with hydrogen only. The reagent employed for this purpose may be a strong acid, as nitric, hydrochloric, or aqua regia, but I prefer colloidal bromine prepared as described hereinafter. I do not advise the use of hydrochloric acid if the compound to be decomposed contains mercury, because of the difficulty of eliminating the last trace of any mercury bichloride that may be formed. The solution, containing the liberated iodine or the hydrogen-iodine compound, may then, if desired, be evaporated to dryness, giving iodine alpha in solid form, which I believe to be a hydrate of the composition $I\alpha(H_2O)_3$.

A similar process may be followed for making a coloidal form of bromine, that is, first passing the bromine through a reaction with an organic acid such as tannic or gallic acid referred to, then forming an insoluble bromine compound of silver, lead, copper or other suitable metal, preferably mercury, which insoluble compound is then decomposed into an insoluble compound devoid of bromine with liberation of the halogen in solution followed (if desired) by evaporation, giving a colloidal bromine hydrate in solid form. I prefer, however, a modified process, as will be described hereinafter, and which is illustrated by the accompanying flow sheet.

In making iodine alpha I prefer to use tannic acid, using an aqueous solution containing not more than about 150 grams of the acid per liter. In this I dissolve ordinary commercial iodine in amount slightly less than enough to satisfy what apparently would be the reaction if, as before stated, tannic acid had an odd or loose atom of hydrogen, namely,

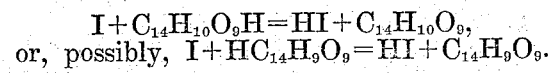

$$I + C_{14}H_{10}O_9H = HI + C_{14}H_{10}O_9,$$
or, possibly, $I + HC_{14}H_9O_9 = HI + C_{14}H_9O_9$.

The solution may be warmed to hasten the reaction, but the temperature should be kept below the point at which iodine vapors are given off.

When the iodine is all dissolved I cause the hydorgen iodide (HI) to react with mercurous or mercuric nitrate, preferably the former, forming collodial mercurous or mercuric iodide (HgI or HgI$_2$). This is done by adding the nitrate in aqueous solution, the hydrogen iodide solution being hot or cold as desired.

The insoluble mercury iodide produced as above is separated by filtering or decanting the liquid and after thorough washing I treat it with an aqueous solution of colloidal bromine, using as nearly as possible the exact amount of bromine needed to satisfy the equation $HgI + Br = HgBr + I$, or $$HgI_2 + Br_2 = HgBr_2 + I_2.$$

I also prefer to use a strong solution of bromine, to lessen the amount of water which is later removed by evaporation.

The liquid, containing the iodine in solution, is separated, from the insoluble mercurous or mercuric bromide by filtering or decanting, and may then be evaporated to dryness. "Iodine alpha" is thus obtained in the form of a reddish brown powder, apparently of the composition $I\alpha(H_2O)_3$. This hydrate is stable at temperatures up to 100° C. and even higher, but a few degrees more cause it to lose one molecule of water, and at about 170° it loses a second molecule. The trihydrate is soluble in water at room temperature. A strong solution of it is red. The dihydrate is partly soluble at room temperature and dissolves completely in warm water, while the monohydrate dissolves only in boiling water. They all form stable homogeneous solutions and I have not been able to precipitate any of them except in jelly form.

Instead of bromine I may use any known method of breaking up the insoluble iodide to release the colloidal iodine thereof, taking the usual precautions customary in decomposing a colloidal salt, since the iodides formed in my process are colloidal. For example, if an electrolyte, such as common salt (NaCl) is employed for the purpose the two substances should be intimately mixed and heated to boiling or the separation of iodine will be effected only partially if at all.

When using gallic acid in the first step I proceed in the same way as with tannic acid except that the gallic acid is dissolved in hot water, and the solution is cooled down to about 35° C. before dissolving the iodine. The latter should be added in such amount that the quantity dissolved does not exceed about 35 grams per liter, and the amount of acid in solution should be about 8 per cent in excess of what would be enough to satisfy such an equation as $$(OH)_3C_6H_2CO_2H.H_2O + I =$$
$$(OH)_3C_6H_2CO_2.H_2O + HI,$$

assuming gallic acid to have the composition stated therein. Throughout the process the solutions are kept warm but below the temperature at which iodine vapors appear.

Iodine alpha is soluble in water but insoluble in alcohol, chloroform, carbon disulfide, etc. It is colloidal and forms an emulsoid or homogenous solution. It colors starch paste brown instead of blue, and its iodides are mostly different in color or tone from iodides made from ordinary iodine. For example, it forms black alkali iodides and its ferrous salt is red, whereas ordinary alkali iodides are white and ordinary ferrous iodide is green. It also forms non-toxic iodides and double iodides.

As stated above, I may prepare colloidal bromine in much the same way as I prepare iodine alpha. For example the insoluble colloidal bromide of silver, lead, copper, bismuth, mercury or other metal is preferably decomposed by treating the heated bromide with nitric acid, causing, apparently, the reaction $$HgBr_2 + 2HNO_3 = HgO + N_2O_5 + 2HBr.$$

The nitrogen pentoxide goes off as a gas. The insoluble oxide is removed and the filtrate is evaporated to dryness, giving a powder which appears to have the composition $Br(H_2O)_5$. Or to the hydrogen bromide solution (made preferably with tannic acid) I add an alkali metal hydroxide, by preference potassium hydroxide, forming an insoluble compound which appears to be a tannate. The greater part of the latter separates out, and is removed by filtration. The solution is allowed to stand several weeks for further precipitation and the filtered solution is heated to about 60° C. When quite cold it is filtered again, leaving substantially pure hydrogen bromide (HBr) in solution, which is evaporated to dryness. In this step the bromide is broken up. I do not claim coloidal bromine or bromine compounds specifically herein, nor processes specifically directed to the production thereof, but do in my copending application Serial No. 367,718, filed May 31, 1929.

In accordance with the statutes I have described my invention in such detail as will enable others, skilled in the art to which it appertains or to which it most nearly related, to practice my invention, and I have also stated what I believe to be a correct scientific theory, but I desire it to be understood that I do not consider the invention limited to such theory or to the details referred to.

I claim:—

1. In the process of preparing colloidal halogen, the steps which comprise reacting the halogen with a soluble organic acid, whereby a hydrogen halide is produced, and then effecting a metathetical reaction by adding a compound adapted to react with the said hydrogen halide, whereby an insoluble halide is formed.

2. In the process of preparing colloid halogen, the steps which comprise reacting the halogen with a soluble organic acid, whereby a hydrogen halide is produced, effecting a metathetical reaction by adding a compound adapted to react with the said hydrogen halide, whereby an insoluble halide is formed and then adding a reagent capable of displacing the halogen from the said insoluble halide, whereby the said halogen is obtained in colloidal form.

3. In a process of preparing colloidal iodine, the steps which comprise reacting iodine with a soluble organic acid, whereby hydrogen iodide is produced, and then effecting a metathetical reaction by adding a compound adapted to react with the said hydrogen iodide, whereby an insoluble iodide is formed.

4. In the process of preparing colloidal iodine, the steps which comprise reacting iodine with a soluble organic acid, whereby hydrogen iodide is produced, effecting a metathetical reaction by adding a compound adapted to react with the said hydrogen iodide, whereby an insoluble iodide is formed, and then adding a reagent capable of displacing the iodine from the said insoluble iodide, whereby the said iodine is obtained in colloidal form.

5. In a process of treating iodine, dissolving iodine in a solution of tannic acid whereby hydrogen iodide is produced, converting the hydrogen iodide into an insoluble iodide, removing the latter, and treating it with a colloidal form of bromine in aqueous solution whereby an insoluble bromide and soluble iodine hydrate are produced.

6. In a process of treating iodine, the steps set forth in the immediately preceding claim, followed by separation of the insoluble bromide from the solution of iodine hydrate and recovery of the latter in solid form by evaporation.

7. In a process of treating iodine, the steps comprising dissolving ordinary iodine in a solution of tannic acid and producing thereby hydrogen iodide in solution, adding a mercury salt to the solution to produce an insoluble iodide of mercury, removing the latter and treating it with an aqueous solution of colloidal bromine to produce an insoluble bromide of mercury with liberation of iodine in solution, and removing the insoluble bromide from the solution.

8. In a process of treating iodine, the steps set forth in the immediately preceding claim, followed by recovery of the iodine of the solution as a hydrate in solid form by evaporating the solution to dryness.

9. In a process of treating iodine to produce a colloidal form thereof, dissolving ordinary iodine in a solution of tannic acid to form hydrogen iodide in solution, adding mercury nitrate to the solution to precipitate mercury iodide, separating the latter and treating it with colloidal bromine in solution to precipitate mercury bromide and liberate iodine in solution, removing the precipitate, and recovering from the solution iodine in the form of a colloidal hydrate.

10. As a new product, a halogen in a colloidal, non-toxic form.

11. As a new product, iodine in a colloidal, non-toxic form.

12. As a new product, a colloidal, non-toxic halogen hydrate.

13. As a new product, a colloidal, non-toxic iodine hydrate.

14. As a new product, a compound of the formula $I\alpha 3(H_2O)$.

In testimony whereof I hereto affix my signature.

ERNEST GOVETT.